US012695417B2

(12) United States Patent
Wilde

(10) Patent No.: US 12,695,417 B2
(45) Date of Patent: Jul. 28, 2026

(54) METHOD FOR INSPECTING A PHOTOVOLTAIC ELEMENT, AND PHOTOVOLTAIC ELEMENT WHICH IS INSPECTED USING SUCH A METHOD

(71) Applicant: HELIATEK GmbH, Dresden (DE)

(72) Inventor: Christian Wilde, Dresden (DE)

(73) Assignee: HELIATEK GmbH, Dresden (DE)

( * ) Notice: Subject to any disclaimer, the term of this patent is extended or adjusted under 35 U.S.C. 154(b) by 519 days.

(21) Appl. No.: 17/795,001

(22) PCT Filed: Feb. 1, 2021

(86) PCT No.: PCT/DE2021/100091

§ 371 (c)(1),
(2) Date: Aug. 18, 2022

(87) PCT Pub. No.: WO2021/151438

PCT Pub. Date: Aug. 5, 2021

(65) Prior Publication Data

US 2023/0006607 A1     Jan. 5, 2023

(30) Foreign Application Priority Data

Jan. 31, 2020    (DE) ..................... 10 2020 102 494.0

(51) Int. Cl.
*H02S 50/10*          (2014.01)
*H02S 30/20*          (2014.01)

(52) U.S. Cl.
CPC .............. *H02S 50/10* (2014.12); *H02S 30/20* (2014.12)

(58) Field of Classification Search
CPC .......... H02S 50/10; H02S 30/20; H02S 50/15; Y02E 10/50
See application file for complete search history.

(56) References Cited

U.S. PATENT DOCUMENTS 7,733,111 B1    6/2010  Zhao et al.
8,024,854 B2 *  9/2011  Lu ..................... H01L 21/67721
                                                      29/564

(Continued)

FOREIGN PATENT DOCUMENTS

CN        107483014 A    12/2017
DE    102010050039 B4    11/2011

(Continued)

OTHER PUBLICATIONS

Aberle et al., "A new method for accurate measurements of the lumped series resistance of solar cells", 1993, IEEE, pp. 133-139 (Year: 1993).*

(Continued)

*Primary Examiner* — Huy Q Phan
*Assistant Examiner* — Haidong Zhang
(74) *Attorney, Agent, or Firm* — Viering, Jentschura & Partner mbB

(57)          ABSTRACT

A method for inspecting a photovoltaic element includes providing a photovoltaic element and providing a dark characteristic curve of the photovoltaic element at a specific voltage applied to the photovoltaic element. Individual segments dividing the photovoltaic element without separation are defined. The method includes measuring characteristic curves of the individual segments of the photovoltaic element in a time sequence and illuminating the individual segments with an illumination device at the specific voltage applied to the photovoltaic element. Further, the method includes moving the photovoltaic element along a running direction relative to the illumination device and/or moving the illumination device along a running direction relative to the photovoltaic element; and ascertaining an overall characteristic curve of the photovoltaic element as a function of the dark characteristic curve and the measured characteristic (Continued)

curves of the individual segments, so that the photovoltaic element is able to be inspected.

14 Claims, 7 Drawing Sheets

(56) References Cited

U.S. PATENT DOCUMENTS

| | | | |
|---|---|---|---|
| 2005/0252545 A1* | 11/2005 | Nowlan | H02S 50/10 |
| | | | 136/290 |
| 2006/0103371 A1 | 5/2006 | Manz | |
| 2007/0090371 A1 | 4/2007 | Drechsel et al. | |
| 2009/0217980 A1 | 9/2009 | Pfeiffer et al. | |
| 2009/0238444 A1* | 9/2009 | Su | H02S 50/10 |
| | | | 382/149 |
| 2010/0073011 A1* | 3/2010 | Svidenko | G01N 17/002 |
| | | | 73/865.6 |
| 2012/0125419 A1* | 5/2012 | Pfeiffer | B82Y 10/00 |
| | | | 136/263 |
| 2012/0223733 A1* | 9/2012 | Gunawan | F21V 9/40 |
| | | | 362/1 |
| 2013/0063174 A1 | 3/2013 | Doto et al. | |
| 2013/0160829 A1 | 6/2013 | Uhrich et al. | |
| 2013/0161537 A1 | 6/2013 | Hatakeyama | |
| 2013/0314118 A1 | 11/2013 | Mak et al. | |
| 2015/0039270 A1* | 2/2015 | Long | H02S 50/00 |
| | | | 702/183 |
| 2016/0141497 A1 | 5/2016 | Weiss et al. | |
| 2017/0323808 A1* | 11/2017 | Gislon | H01L 31/0504 |

FOREIGN PATENT DOCUMENTS

| | | | | |
|---|---|---|---|---|
| DE | 112011100041 T5 | 6/2012 | | |
| DE | 102011087047 A1 | 5/2013 | | |
| EP | 1647827 A1 | 4/2006 | | |
| JP | H11026785 A | 6/1997 | | |
| JP | 2002231983 A | * 8/2002 | | |
| JP | 2004281487 A | 10/2004 | | |
| JP | 2006228926 A | 8/2006 | | |
| JP | 2012004447 A | 1/2012 | | |
| JP | 2012089789 A | * 5/2012 | | H01L 31/0352 |
| JP | 2016058697 A | 4/2016 | | |
| KR | 1020170077970 A | 7/2017 | | |
| WO | 2004083958 A2 | 9/2004 | | |
| WO | 2006092134 A1 | 9/2006 | | |
| WO | 2011161108 A1 | 12/2011 | | |
| WO | 2014206860 A1 | 12/2014 | | |
| WO | 2018079657 A1 | 5/2018 | | |

OTHER PUBLICATIONS

English translation of JP-2012089789-A (Year: 2012).*

English translation of JP-2002231983-A (Year: 2002).*

International Search Report issued for the corresponding International patent application No. PCT/DE2021/100091, dated Apr. 22, 2021, 4 pages (for informational purposes only).

German Search Report issued for the corresponding German Patent Application No. 10 2020 102 494.0, dated Jan. 22, 2021, 7 pages (for informational purposes only).

JP Search Report by registered organization issued for the corresponding JP patent application No. JP 2022-546352, dated Nov. 1, 2024, 36 pages (For informational purposes only).

JP Notice of Reasons of Refusal issued for the corresponding JP patent application No. JP 2022-546352, dated Dec. 4, 2024, 6 pages (For informational purposes only).

J. Carstensen, et al., "CELLO: An advanced LBIC measurement technique for solar cell local characterization", Solar Energy Materials and Solar Cells, Bulgaria, 2001, 13 pages.

Bao Hoang, "Commercialization of Deployable Space Systems' roll-out solar array (ROSA) technology for Space Systems Loral (SSL) solar arrays", IEEE Aerospace Conference, 2016, 12 pages.

* cited by examiner

METHOD FOR INSPECTING A PHOTOVOLTAIC ELEMENT, AND PHOTOVOLTAIC ELEMENT WHICH IS INSPECTED USING SUCH A METHOD

CROSS-REFERENCE TO RELATED APPLICATIONS

This is a national phase of PCT Application PCT/DE2021/100091, filed on Feb. 1, 2021, which claims priority to German Application DE102020102494.0, filed on Jan. 31, 2020, the entire contents of each of which are incorporated by reference.

TECHNICAL AREA

The disclosure relates to a method for inspecting a photovoltaic element, and to a photovoltaic element inspected using such a method, in particular for inspecting the production quality and/or for determining optical and/or electrical properties of photovoltaic elements.

BACKGROUND

In order to be electrically characterized, solar cells have to be illuminated homogeneously and over their entire surface with sunlight-like illumination (Standard Testing Conditions-STC), and the currents and voltages that occur have to be measured at appropriate contacts. Solar simulators, what are known as flashers, in this case simulate a spectral width and a spectral intensity distribution that largely correspond to sunlight. Solar simulators used for illumination are highly complex in terms of instrumentation and not arbitrarily scalable in length. Usual solar simulators illuminate areas of up to 3 m². The illumination area of solar simulators for determining the performance of solar cells is finite; especially in the case of particularly large and lengthy solar cells, the area of the solar cells cannot be illuminated all at once with the solar simulator. Measurements of natural sunlight are highly error-prone and practically impossible to achieve with a reasonable throughput.

The homogeneous illumination of solar cells as required in the relevant standards, for example TEC 60904, during an inspection cannot be implemented technically for solar cells having arbitrary lengths and/or widths. The inspection cannot be performed for solar cells having a length and/or width greater than the irradiation area of a solar simulator.

EP 1 647 827 A1 discloses a test system for inspecting the production quality of solar cells, having an optical test device arranged in the test area for visually inspecting the solar cells and an electrical test device for testing the electrical functions of the solar cells with an illumination device for irradiating the solar cells, and an electrical contact device for tapping off voltages at the contacts of the solar cells.

DE 11 2011 100 041 T5 discloses a solar cell inspection apparatus having a solar simulator, a light quantity control section that is connected to the solar simulator in order to control a quantity of light emitted by the array of light emitters of the solar simulator, and an electrical measurement section that is electrically connected to a solar cell having a light-receiving area that is arranged on at least part of the effectively irradiated region of the solar simulator, in order to measure a photoelectric conversion property of the solar cell while an electrical load is applied to the solar cell. Methods known from the prior art for inspecting solar cells do not allow an inspection of solar cells of arbitrary size, especially since these methods are dependent on the size of an area irradiated by a solar simulator.

BRIEF DESCRIPTION OF THE FIGURES

The invention is explained in more detail below with reference to the drawings, in which.

DETAILED DESCRIPTION

Figure 1:
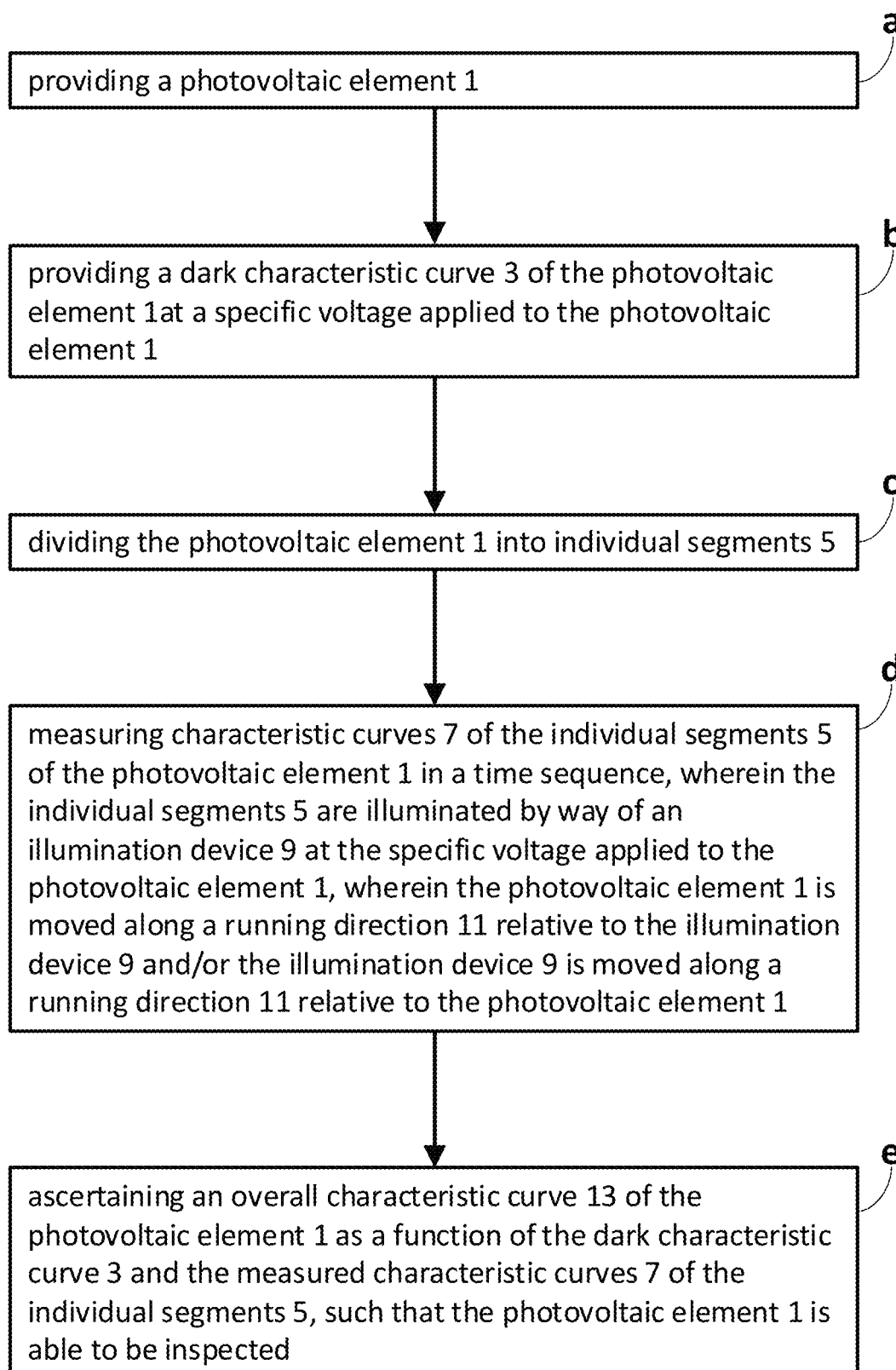
FIG. 1 shows a schematic illustration of one exemplary embodiment of a method for inspecting a photovoltaic element in a flowchart.

Aspects of the disclosure describe providing a method for measuring and inspecting a photovoltaic element of a larger, in particular longer and/or wider, extent in comparison with an illuminated area of a solar simulator, wherein said disadvantages do not arise, and wherein in particular an overall characteristic curve and/or an overall photocurrent for the entire photovoltaic element is ascertained with an area larger than the area illuminated by way of a solar simulator.

Aspects of the disclosure describe providing a method for inspecting a photovoltaic element, preferably for determining the performance of and/or for determining defects in the photovoltaic element. The method comprises the following steps:

a) providing a photovoltaic element, b) providing a dark characteristic curve of the photovoltaic element at a specific voltage applied to the photovoltaic element, c) dividing the photovoltaic element into individual segments, d) measuring characteristic curves of the individual segments of the photovoltaic element in a time sequence, wherein the individual segments are illuminated by way of an illumination device at the specific voltage applied to the photovoltaic element, wherein the photovoltaic element is moved along a running direction relative to the illumination device and/or the illumination device is moved along a running direction relative to the photovoltaic element, and c) ascertaining an overall characteristic curve of the photovoltaic element as a function of the dark characteristic curve and the measured characteristic curves of the individual segments, such that the photovoltaic element is able to be inspected.

An overall photocurrent for the entire photovoltaic element is preferably obtained, wherein the overall photocurrent results from the sum of all of the photocurrents of the individual segments.

The method according to the Disclosure makes it possible to inspect photovoltaic elements of theoretically any length and/or width, in particular through segment-wise illumination and the mathematical composition of the overall characteristic curve. The photovoltaic element is thus not illuminated and measured over its entire area, but rather an overall measurement is composed from a large number of individual measurements with illumination of individual segments. A requirement, for example in the usual standards, whereby a photovoltaic element has to be fully illuminated during the measurement, is therefore not met, but the division of the photovoltaic element into individual segments and the measurement of these homogeneously illuminated individual segments in accordance with the method according to the Disclosure does not exhibit any, or at least exhibits only a very small, deviation in comparison with the full-area illumination of the entire photovoltaic element. The method according to the Disclosure thus makes it possible to inspect photovoltaic elements of almost any length and/or width, and thus also provides access to certification thereof.

In one embodiment, the specific applied voltage is a specific voltage profile, wherein a current of the photovoltaic element and/or of an individual segment is preferably measured as a function of the specific voltage profile.

Dividing the photovoltaic element into individual segments is understood to mean in particular a theoretical division of the photovoltaic element into individual segments.

Measuring characteristic curves of the individual segments of the photovoltaic element in a time sequence is understood to mean in particular that the characteristic curves of at least two mutually adjacent segments of a photovoltaic element are measured in immediate temporal succession.

A dark characteristic curve is understood to mean in particular a characteristic curve when the photovoltaic element is at least largely darkened, preferably when the photovoltaic element is completely darkened.

In the context of the Disclosure, a characteristic curve is understood to mean in particular the dependency of a photocurrent $I_{Ph}(V)$ on the applied voltage, that is to say a photocurrent-voltage characteristic curve, of a photovoltaic element or of a segment of a photovoltaic element.

In one embodiment, the characteristic curve of a segment is ascertained from the dark characteristic curve and the characteristic curve of the segment under illumination. In one embodiment, the overall characteristic curve of the photovoltaic element is ascertained from the dark characteristic curve and the characteristic curves of the individual segments under illumination.

In one embodiment, the photocurrent of a segment is ascertained from the dark characteristic curve and the characteristic curve of the segment under illumination. In one embodiment, the overall characteristic curve is ascertained from the photocurrents of the individual segments and from the dark characteristic curve of the photovoltaic element; the overall photocurrent of the photovoltaic element is preferably ascertained from the sum of the photocurrents of the individual segments.

In one embodiment, the characteristic curves of the individual segments of the photovoltaic element are measured discontinuously, in particular stepwise.

In one embodiment, the characteristic curves of the individual segments of the photovoltaic element are measured continuously.

In one embodiment, the division of the photovoltaic element in step b) and the movement of the photovoltaic element along a running direction relative to the illumination device and/or the movement of the illumination device along a running direction relative to the photovoltaic element in step c) take place at least partially at the same time.

In one embodiment, the illumination device is a solar simulator.

In one embodiment, the individual segments of the photovoltaic element are illuminated with the photoactive area parallel to the illumination device, in particular parallel to a light source of the illumination device.

A photovoltaic element is understood to mean in particular a solar cell, wherein the photovoltaic element has at least one photovoltaic cell. The photovoltaic element preferably has a plurality of photovoltaic cells. The photovoltaic cells may be arranged and/or interconnected in the photovoltaic element in different ways.

In one embodiment, the photovoltaic element has at least two photovoltaic cells, wherein the at least two photovoltaic cells are continuous in the direction of successive segments, in particular continuously electrically conductive, or are formed of cells that are interconnected in parallel with one another in the direction of successive segments, and are connected in parallel and/or in series with one another. The photovoltaic cells are preferably formed over the entire length of the photovoltaic element and/or the photovoltaic cells are interconnected in parallel with one another over the entire length of the photovoltaic element.

In one embodiment, the photovoltaic element is divided into segments such that all photovoltaic cells connected in series have the same surface area in each individual segment.

In one embodiment, the photovoltaic element is an organic photovoltaic element, wherein at least one photoactive layer of the organic photovoltaic element preferably has small molecules as absorber material.

In one embodiment, the photovoltaic element is a flexible photovoltaic element, in particular a flexible organic photovoltaic element.

In one embodiment, the photovoltaic element has at least one photovoltaic cell having at least one photoactive layer, in particular a CIS, CIGS, GaAs, or Si cell, a perovskite cell or an organic photovoltaic element (OPV). An organic photovoltaic element is understood to mean in particular a photovoltaic element having at least one organic photoactive layer, in particular a polymeric organic photovoltaic element or an organic photovoltaic element on the basis of small molecules. While polymers are distinguished by being not evaporable and therefore only being able to be applied from solutions, small molecules are usually evaporable and may be applied either like polymers as a solution, but also by way of vapor deposition technology, in particular by vapor deposition from a vacuum. Small molecules are understood to mean in particular non-polymeric organic molecules having monodisperse molar masses between 100 and 2000 g/mol that exist in the solid phase at standard pressure (air pressure of the ambient atmosphere) and at room temperature. In particular, the small molecules are photoactive, "photoactive" being understood to mean that the molecules undergo a change of charge state and/or of polarization state when light is supplied.

In one embodiment, the photoactive layer of the layer system comprises small molecules that are evaporable in vacuo. In one embodiment, at least the photoactive layer of the layer system is vapor deposited in vacuo.

One possible structure of the layer system of an optoclectronic component is described in WO2004083958A2 and WO2011161108A1. Use is preferably made here of layer systems in which the photoactive layers comprise absorber materials that are evaporable and that are or have been applied by physical vapor deposition (PVD). To this end, use is made of materials belonging to the group of small molecules, which are described, inter alia, in WO2006092134A1 and WO2014206860A1. The photoactive layers form acceptor/donor systems and may of a plurality of individual layers, or mixed layers, as a planar heterojunction and preferably as a bulk heterojunction. Layer systems completely applied by way of physical vapor deposition are preferred.

The method of inspecting a photovoltaic element has advantages compared to the prior art. Advantageously, it is possible to inspect photovoltaic elements of almost any length and/or width by way of an illumination device. Advantageously, the method is easy to apply and inexpensive. Advantageously, it becomes possible to inspect areas of a photovoltaic element that are of largely any size. This advantageously enables measurement of lengthy photovoltaic elements, in particular including having a length and/or width of more than 2 m, in accordance with the usual standards, for example IEC 60904-1:2006.

According to one development, provision is made for the individual segments to be illuminated over their entire area, preferably over their entire photoactive area, and/or for the individual segments of the photovoltaic element and/or the individual segments among themselves to each be illuminated at least largely homogeneously.

Homogeneous illumination is understood to mean in particular illumination of a segment, in particular an area of the segment, that is as uniform as possible, preferably over the entire area of the segment.

According to one development, provision is made for the overall characteristic curve of the photovoltaic element to be ascertained in step e) by summing photocurrents ascertained from the dark characteristic curve of the photovoltaic element and from the measured characteristic curves of the individual segments.

Summing characteristic curves is also understood to mean in particular composing characteristic curves. When summing, an ascertained photocurrent of at least one further characteristic curve in ambient light is in particular additionally subtracted from an ascertained photocurrent of a characteristic curve under illumination.

According to one development, provision is made for a segment of the photovoltaic element to have at least largely no overlap and at least largely no gap with a previous segment and/or with a following segment in the running direction. This makes it possible to ensure that no area, in particular no photoactive area, of the photovoltaic element is measured twice and/or part of the area of the photovoltaic element is not measured.

According to one development, provision is made for the photovoltaic element, preferably a photoactive area of the photovoltaic element, to be completely covered by the individual segments.

According to one development, provision is made for the dark characteristic curve of the photovoltaic element to be provided, preferably measured, in step b) before or after step d) of the method, and/or for steps c) and d) to be performed together. In one embodiment, the dark characteristic curve of the photovoltaic element is measured. In one alternative embodiment, the dark characteristic curve of the photovoltaic element is already known.

According to one development, provision is made for the dark characteristic curve of the photovoltaic element in step b) to be a dark characteristic curve in complete or largely complete darkness.

According to one development, provision is made, when ambient light is present, for at least one further characteristic curve to be measured at the specific voltage applied to the photovoltaic element and in ambient light, wherein the individual segments and/or the photovoltaic element are not illuminated by way of the illumination device, and wherein the overall characteristic curve of the photovoltaic element is additionally ascertained in step e) as a function of the at least one further characteristic curve in ambient light, and/or the overall characteristic curve of the photovoltaic element is ascertained in step e) by additionally subtracting the photocurrents of ambient light ascertained from the further measured characteristic curves of the individual segments in ambient light.

Ambient light is understood to mean in particular ambient light present when measuring a dark characteristic curve of the photovoltaic element and/or individual segments of the photovoltaic element, and/or when measuring the characteristic curve of the photovoltaic element and/or individual segments of the photovoltaic element under illumination by way of the illumination device, in particular when the environment is not completely dark. In this case, the ambient light leads to an additional photocurrent of the photovoltaic element and/or of the individual segments of the photovoltaic element, and thereby influences the ascertainment of the overall photocurrent. The intensity of the ambient light is in particular significantly lower in comparison with the intensity of the illumination by way of the illumination device; the intensity of the ambient light is preferably at most 10%, preferably at most 8%, preferably at most 5%, or preferably at most 2% of the intensity of the illumination by way of the illumination device.

According to one development, provision is made for a length of the segments in the running direction to be 10 cm to 10 m, preferably 10 cm to 2 m, and/or for the photovoltaic element to be divided into individual segments depending on an area illuminated by way of the illumination device.

In one embodiment, the length of the individual segments in the running direction is 10 cm to 10 m, preferably 10 cm to 5 m, preferably 10 cm to 2 m, preferably 10 cm to 1 m, preferably 20 cm to 10 m, preferably 20 cm to 5 m, preferably 20 cm to 2 m, or preferably 20 cm to 1 m, or at least 10 cm, preferably at least 20 cm, preferably at least 60 cm, preferably at least 1 m, or preferably at least 2 m. In one embodiment, the length of the individual segments is at least $\frac{1}{20}$ of the length of the photoactive area of the photovoltaic element, preferably at least $\frac{1}{10}$, or preferably at least $\frac{1}{8}$.

A length of a photovoltaic element and/or of a segment of a photovoltaic element is alternatively also understood to mean in particular a width of a segment of a photovoltaic element, wherein the length and/or the width is preferably independent of the running direction relative to the illumination device.

According to one development, provision is made for the method to be performed in a roll-to-roll process, and/or for the photovoltaic element to be a flexible photovoltaic element, wherein, during the method, a first end and/or a second end of the photovoltaic element is preferably present in partially or fully wound-up form.

One object of the disclosure may be achieved by providing a photovoltaic element inspected using a method, in particular using one of the exemplary embodiments described above. In this case, the advantages that have already been described in connection with the method for inspecting a photovoltaic element result in particular for the photovoltaic element.

FIG. 1 shows a schematic illustration of one exemplary embodiment of a method for inspecting a photovoltaic element in a flowchart.

If the photovoltaic element 1 is larger than the illumination area of a solar simulator, a direct performance measurement is not possible. An electrical functional test of the photovoltaic element 1 is possible by illuminating in each case only part of the photovoltaic element 1, which is divided into individual segments 5, ascertaining characteristic curves 7 of the individual segments 5 and reconstructing or composing an overall characteristic curve 13 therefrom.

The method for inspecting a photovoltaic element 1, preferably for determining the performance of and/or for determining defects in the photovoltaic element 1, comprises the following steps: a) providing a photovoltaic element 1, b) providing a dark characteristic curve 3 of the photovoltaic element 1 at a specific voltage applied to the photovoltaic element 1, c) dividing the photovoltaic element 1 into individual segments 5, d) measuring characteristic curves 7 of the individual segments 5 of the photovoltaic element 1 in a time sequence, wherein the individual segments 5 are illuminated by way of an illumination device 9 at the specific voltage applied to the photovoltaic element 1, wherein the photovoltaic element 1 is moved along a running direction 11 relative to the illumination device 9 and/or the illumination device 9 is moved along a running direction 11 relative to the photovoltaic element 1, and e) ascertaining an overall characteristic curve 13 of the photovoltaic element 1 as a function of the dark characteristic curve 3 and the measured characteristic curves 7 of the individual segments 5, such that the photovoltaic element 1 is able to be inspected.

The photovoltaic element 1 is in this case guided in particular in a running direction 11 in a production installation.

It is thereby possible to inspect photovoltaic elements 1 of almost any length and/or width by way of an illumination device 9. The method is easy to apply and inexpensive. This advantageously enables measurement of lengthy and/or large photovoltaic elements 1, in particular including having a length and/or width of more than 2 m.

In one refinement, the individual segments 5 may be illuminated over their entire area 15, preferably over their entire photoactive area, and/or the individual segments 5 of the photovoltaic element 1 and/or the individual segments 5 among themselves are each illuminated at least largely homogeneously.

In a further refinement, the overall characteristic curve 13 of the photovoltaic element 1 is ascertained in step e) by summing photocurrents ascertained from the dark characteristic curve 3 of the photovoltaic element 1 and from the measured characteristic curves 7 of the individual segments 5.

In a further refinement, a segment 5 of the photovoltaic element 1 has at least largely no overlap and at least largely no gap with a previous segment 5 and/or with a following segment 5 in the running direction 11.

In a further refinement, the photovoltaic element 1, preferably a photoactive area of the photovoltaic element 1, is completely covered by the individual segments 5.

In a further refinement, the dark characteristic curve 3 of the photovoltaic element 1 is provided, preferably measured, in step b) before or after step d) of the method, and/or steps c) and d) are performed together.

In a further refinement, the dark characteristic curve 3 of the photovoltaic element 1 in step b) is a dark characteristic curve 3 in complete or largely complete darkness.

In a further refinement, when ambient light is present, at least one further characteristic curve 17 is measured at the specific voltage applied to the photovoltaic element 1 and in ambient light, wherein the individual segments 5 and/or the photovoltaic element 1 are not illuminated by way of the illumination device 9, and wherein the overall characteristic curve 13 of the photovoltaic element 1 is additionally ascertained in step e) as a function of the at least one further characteristic curve 17 in ambient light, and/or the overall characteristic curve 13 of the photovoltaic element 1 is ascertained in step e) by additionally subtracting the photocurrents of ambient light ascertained from the further measured characteristic curves 17 of the individual segments 5 in ambient light.

In a further refinement, a length of the segments 5 in the running direction 11 is 10 cm to 10 m, preferably 10 cm to 2 m, and/or the photovoltaic element 1 is divided into individual segments 5 depending on an area 19 illuminated by way of the illumination device 9. In one alternative refinement, the length of the individual segments is at least 1/10 of the length of the photoactive area of the photovoltaic element.

In a further refinement, the method is performed in a roll-to-roll process, and/or the photovoltaic element 1 is a flexible photovoltaic element 1, wherein, during the method, a first end and/or a second end of the photovoltaic element 1 is preferably present in partially wound-up form.

Figure 2:
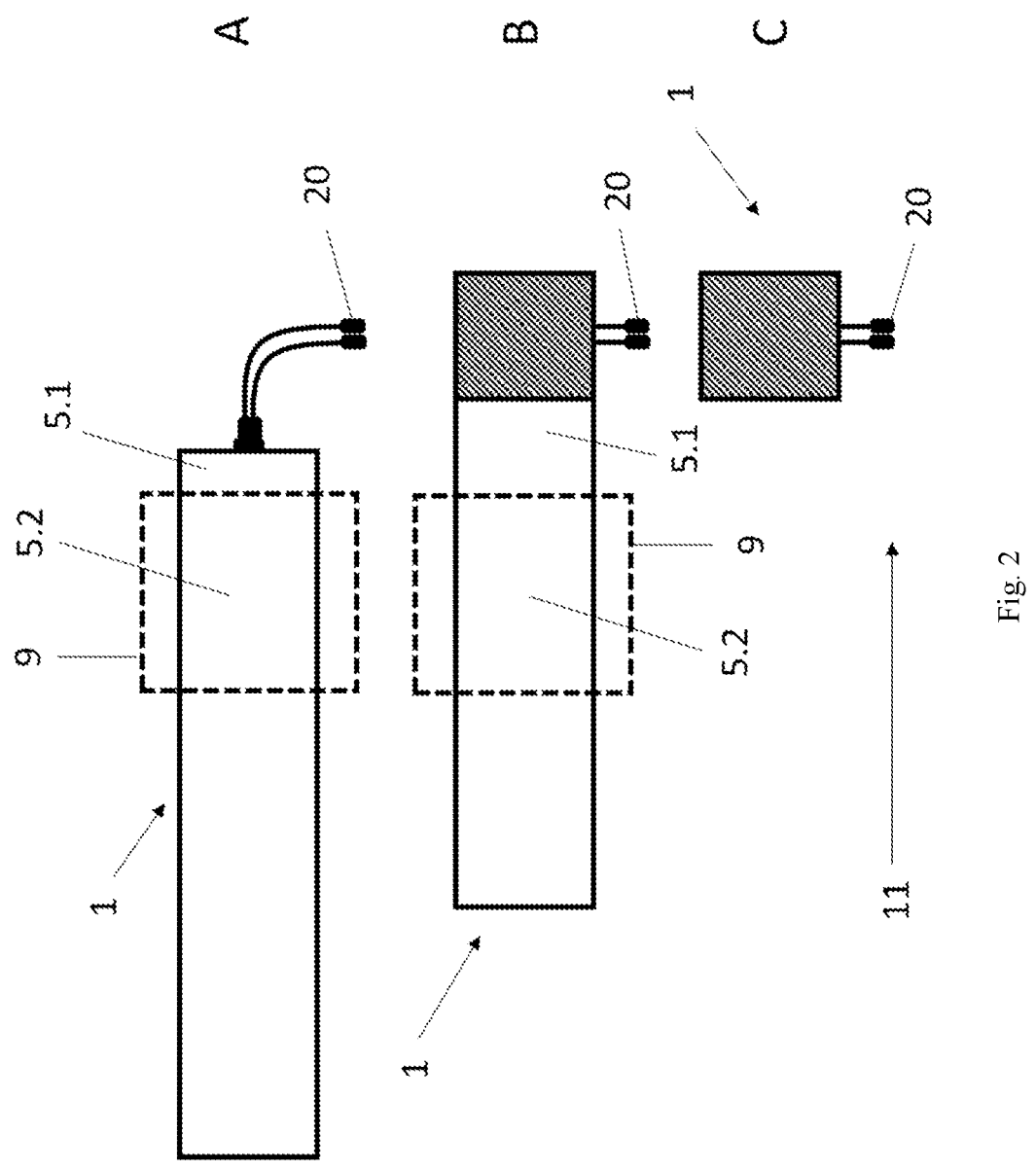
FIG. 2 shows a schematic illustration of one exemplary embodiment of a plurality of arrangements of a photovoltaic element relative to an illumination device during a method for inspecting a photovoltaic element in a plan view.

FIG. 2 shows a schematic illustration of one exemplary embodiment of a plurality of arrangements of a photovoltaic element 1 relative to an illumination device 9 during a method for inspecting a photovoltaic element 1 in a plan view. Identical and functionally equivalent elements have been provided with the same reference signs, and so reference is made to the description above in this respect.

In an initial step A, in this exemplary embodiment, a first segment 5.1 of the photovoltaic element 1, at one end of the photovoltaic element 1, is illuminated by the illumination device 9, wherein, with a specific voltage applied to the photovoltaic element 1, a characteristic curve 7 of the first segment 5.1 is measured, in particular photocurrents are ascertained, wherein the other segments 5 are at least largely darkened. The specific voltage may be applied to the photovoltaic element 1 via a connection element 20.

In a further step B, the photovoltaic element 1 is moved in a running direction 11 relative to the illumination device 9, such that a second segment 5.2 of the photovoltaic element 1 is illuminated by the illumination device 9. One end of the photovoltaic element 1 with the first segment 5.1 arranged thereon may in this case be at least partially wound onto a winding element. In the same way as step A, in step B, with a specific voltage applied to the photovoltaic element 1, a characteristic curve 7 of the second segment 5.2 is also ascertained, in particular photocurrents are ascertained, wherein the other segments 5 are at least largely darkened. Depending on the length of the photovoltaic element 1 and the resulting number of individual segments 5, the method is performed until the characteristic curves 7, in particular the photocurrents, of all of the individual segments 5 have been measured. In this exemplary embodiment, the individual segments 5 were illuminated with 1000 W/m². The photovoltaic element 1 is in this case in particular divided into individual segments 5 such that there are at least largely no gaps between individual segments 5 following one another on the photovoltaic element 1, for example the first segment 5.1 and the second segment 5.2, and at least largely no overlap between segments 5 following one another on the photovoltaic element 1, for example the first segment 5.1 and the second segment 5.2. The length of the individual segments 5 may in this case be adapted to an area 19 of the illumination device 9. One end of a segment 5 does not have to be in seamless contact with the two ends of the photovoltaic element 1, since photocurrent is generated only in the active region of the photovoltaic element 1. Each region of the photovoltaic element 1 may be illuminated only once.

In a step C, the photovoltaic element 1 is completely measured over the individual segments 5 and is present in completely rolled-up form in this exemplary embodiment. A dark characteristic curve 3 required for the method may be obtained by measuring the characteristic curve of the photovoltaic element 1, in particular the complete photoactive area of the photovoltaic element, at the specific voltage without illumination, in particular in the greatest possible darkness without ambient light, for example in the wound-up state of the photovoltaic element 1. The overall characteristic curve 13 of the photovoltaic element 1 is composed from the measured characteristic curves 7 of the individual segments 5 and the dark characteristic curve 3.

In one exemplary embodiment, the photovoltaic element 1 consists of a sequence of thin layers, the layer system, with at least one photoactive layer, which is preferably vapor deposited in vacuo or processed from a solution. The electrical link may be implemented by metal layers, transparent conductive oxides and/or transparent conductive polymers. The photovoltaic element 1 may be a flexible photovoltaic element 1 and may be present in at least partially wound-up form during or at the end of the method.

Figure 3:
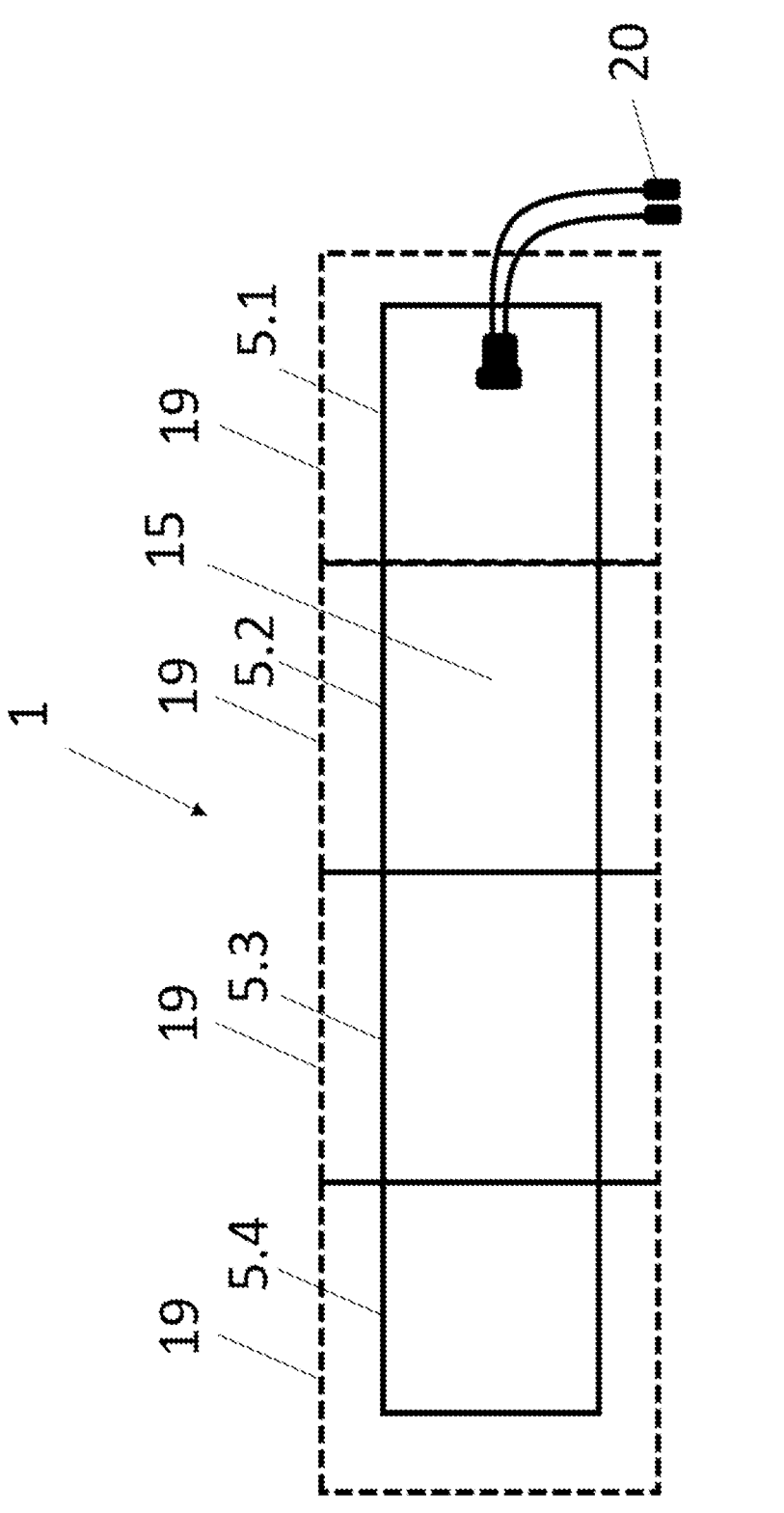
FIG. 3 shows a schematic illustration of one exemplary embodiment of a division of a photovoltaic element into individual segments in a plan view.

FIG. 3 shows a schematic illustration of one exemplary embodiment of a division of a photovoltaic element 1 into individual segments 5 in a plan view. Identical and functionally equivalent elements have been provided with the same reference signs, and so reference is made to the description above in this respect.

In this exemplary embodiment, the photovoltaic element 1 is divided into individual segments 5.1, 5.2, 5.3, 5.4. The individual segments 5 may in this case have a different length in the running direction of the photovoltaic element 1; for example, the segments 5.2, 5.3 are of the same length, while the segments 5.1, 5.4 are shorter in comparison therewith. In the method, the individual segments 5 are completely illuminated by the area 19 of the illumination device 9 in a time sequence.

In this exemplary embodiment, the photovoltaic element 1 is produced and/or measured in a roll-to-roll process. The first end of the photovoltaic element 1 and/or the second end of the photovoltaic element 1 are present in at least partially rolled-up form during the method, wherein a segment 5 to be measured is present in non-rolled-up form, such that a characteristic curve of the segment 5 is able to be measured under illumination by way of an illumination device 9. When measuring the individual segments 5, a specific voltage is applied to the photovoltaic element 1 and the photocurrent is ascertained as a function of a voltage profile.

Figure 4:
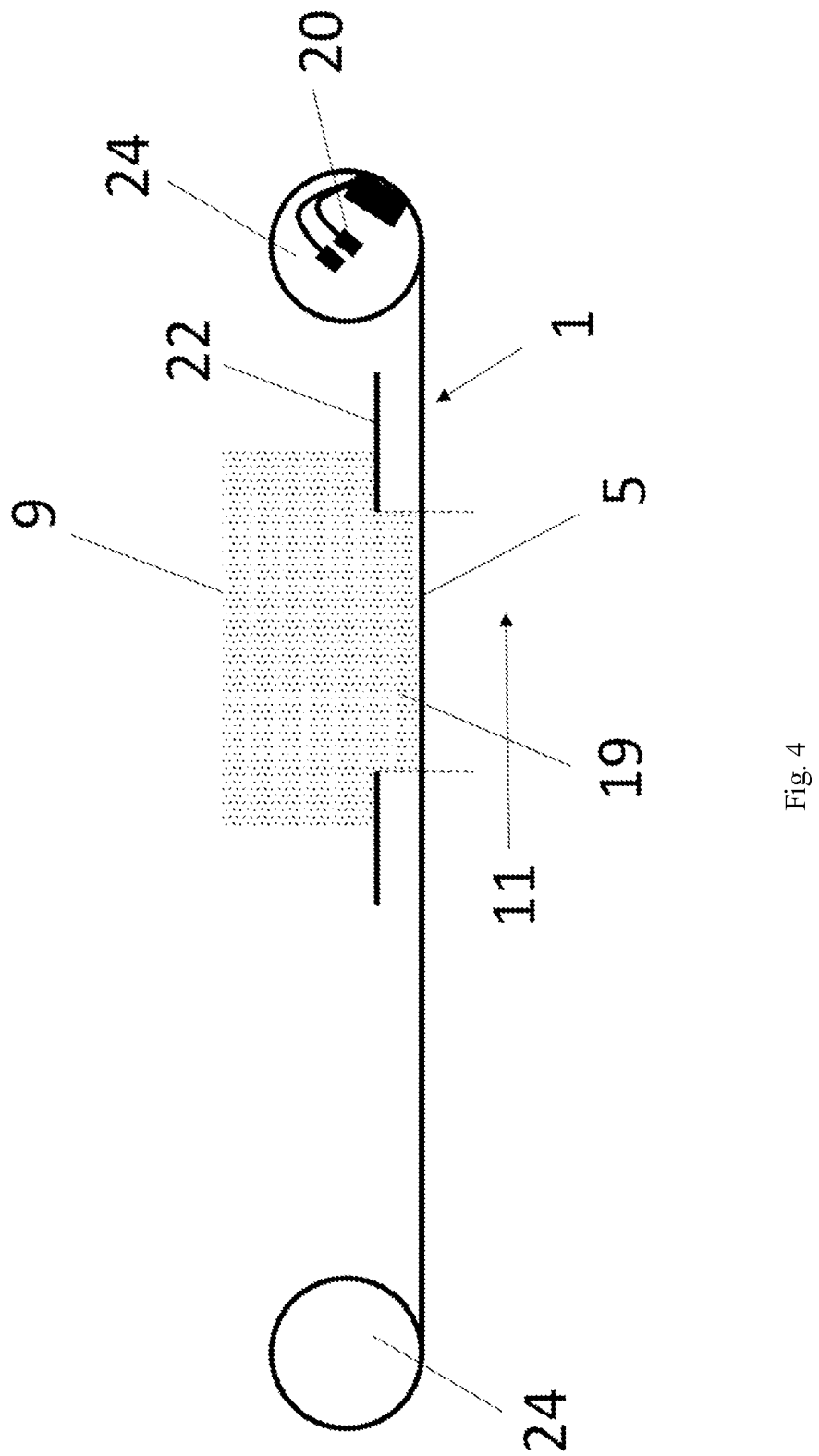
FIG. 4 shows a schematic illustration of one exemplary embodiment of an apparatus for performing a method for inspecting a photovoltaic element in a side view.

FIG. 4 shows a schematic illustration of one exemplary embodiment of an apparatus for performing a method for inspecting a photovoltaic element 1 in a side view. Identical and functionally equivalent elements have been provided with the same reference signs, and so reference is made to the description above in this respect.

In this exemplary embodiment, the apparatus, designed to perform a method disclosed herein, has an illumination device 9 for illuminating the photovoltaic element 1, a covering device 22 for defining the area 19 illuminated by way of the illumination device 9, an electrical connection element 20 for applying a specific voltage to the photovoltaic element 1, and a transport unit 24 having two winding elements for moving the photovoltaic element 1. The apparatus is designed in particular for a roll-to-roll process, wherein the photovoltaic element 1 is in particular moved relative to the illumination device 9. In the region of the illumination device 9, the segment 5 located there is arranged as flat as possible with its surface facing the illumination device 9 with the photoactive layer. The transport unit 24 moves the photovoltaic element such that, after one segment 5 has been measured, a following segment 5 is moved under the illumination device 9. The covering device 22 ensures that the individual segments 5 are able to be illuminated separately from one another by way of the illumination device 9, such that the individual segments 5 are able to be measured in a time sequence.

The photovoltaic element 1 is in this case measured in a manner divided into individual segments 5. For this purpose, each segment 5 is illuminated by way of the illumination device 9 and a covering device 22, preferably an aperture mask, arranged between the illumination device 9 and the photovoltaic element 1. The covering device 22 is then moved relative to the photovoltaic element 1 or the photovoltaic element 1 is moved relative to the covering device 22, and all of the individual segments 5, that is to say the entire photovoltaic element 1, are thus measured. If the dark characteristic curve 3 is not yet available, the individual segment 5 or the photovoltaic element 1 as a whole may be measured in the dark without illumination in order to obtain the dark characteristic curve 3. The overall characteristic curve 13 results from the dark characteristic curve 3, which is the same for all measurements, and the characteristic curves 7 of the individual segments 5.

In one refinement, the apparatus for performing the method additionally has a testing device arranged in the region of the apparatus for measuring and/or inspecting the individual segments 5 and the photovoltaic element 1 (not illustrated). The testing device is in this case operatively connected to the illumination device 9, the covering device 22, the connection element 20 and/or the transport unit 24.

In this exemplary embodiment, the photovoltaic element 1 may be at least partially wound up on winding elements at both ends; the photovoltaic element 1 is in this case arranged between the winding elements. In order to move the photovoltaic element 1 in the apparatus relative to the illumination device 9, the photovoltaic element 1 is wound up or unwound.

Figure 5:
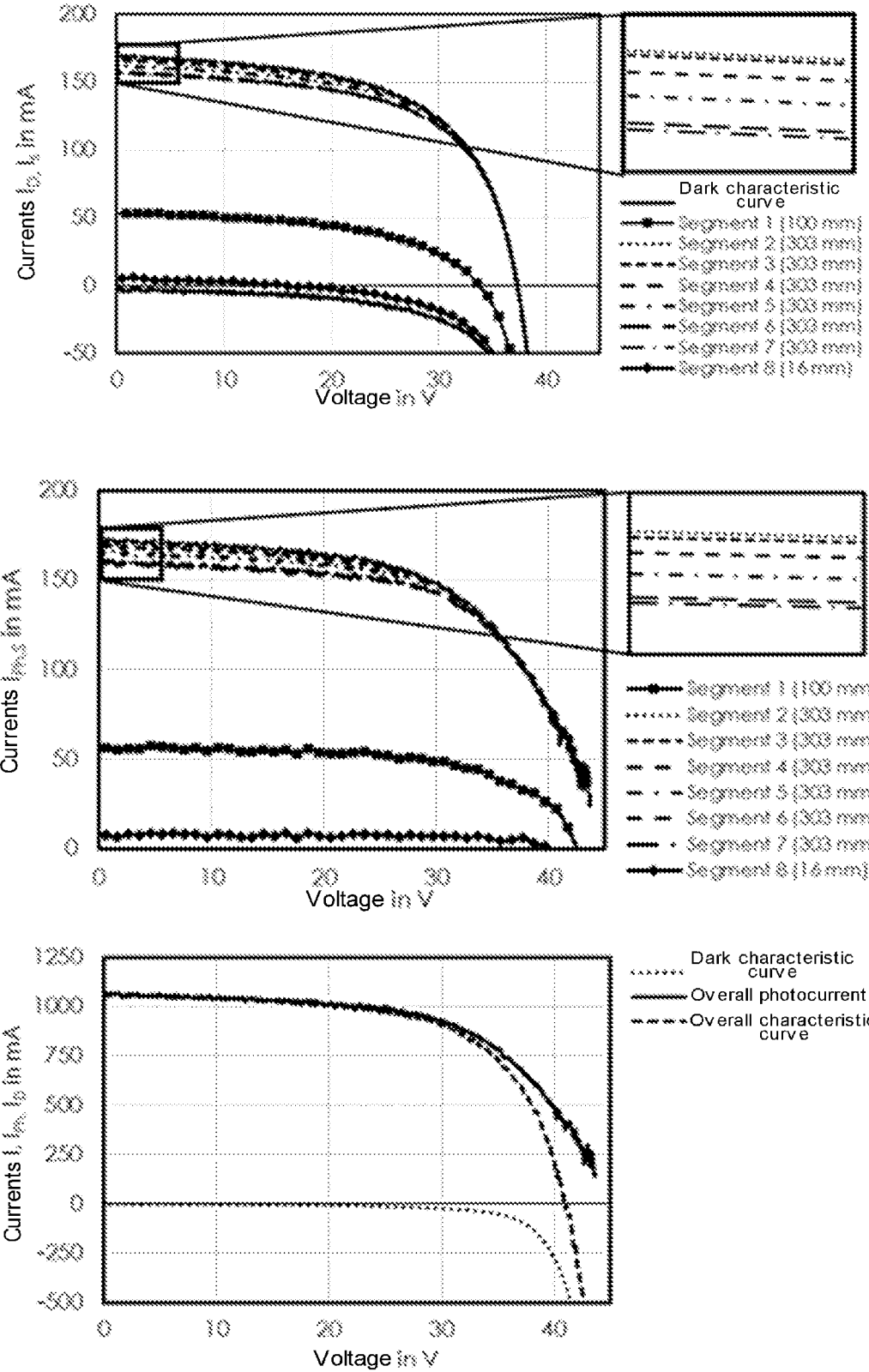
FIG. 5 shows an exemplary embodiment of an overall characteristic curve of a photovoltaic element ascertained from a dark characteristic curve and characteristic curves of individual segments using a method according to the invention.

FIG. 5 shows one exemplary embodiment of an overall characteristic curve 13 of a photovoltaic element 1 ascertained from a dark characteristic curve 3 and characteristic curves 7 of individual segments 5 using a method disclosed herein. Identical and functionally equivalent elements have been provided with the same reference signs, and so reference is made to the description above in this respect.

The principle of the method according to the disclosure is illustrated in one exemplary embodiment in FIG. 5, wherein the overall characteristic curve 13 of the photovoltaic element 1 is composed from the characteristic curves 7 of individual segments 5 and the dark characteristic curve 3 of the photovoltaic element 1. The photovoltaic element 1 has a length of the photoactive area of 1934 mm, wherein the photovoltaic element 1 is divided into individual segments 5 such that the segments 5 at the ends of the photovoltaic element 1 are formed, at 100 mm and 16 mm, somewhat shorter than the intermediate 6 segments 5, each having a length of 303 mm.

In FIG. 5A, a dark characteristic curve 3 and characteristic curves 7 of all of the individual segments 5 under illumination of the photovoltaic element 1 are plotted. For clarification, the enlarged section shows the profile of characteristic curves 7 of the segments 5 that are close to one another.

In FIG. 5B, the photocurrents that were ascertained from the characteristic curves 7 of all of the individual segments 5 under illumination (see FIG. 5A) are plotted, wherein a photocurrent of the dark characteristic curve 3 of the photovoltaic element 1 has been subtracted from the photocurrents of the characteristic curves 7 of the individual illuminated segments 5, giving the photocurrents $I_{Ph,s}(V)$ of the individual segments 5. For clarification, the enlarged section shows the profile of photocurrents of the segments 5 that are close to one another.

In FIG. 5C, the dark characteristic curve 3 of the photovoltaic element 1, the sum of the photocurrents of all of the individual segments 5 (see FIG. 5B), and the overall characteristic curve 13 of the photovoltaic element 1 composed therefrom are plotted.

The photovoltaic element 1 may be described by two current-voltage characteristic curves: The dark characteristic curve 3 $I_D(V)$, and a characteristic curve I(V) under illumination. The current obtained under illumination of the photovoltaic element 1 is the photocurrent, $I_{ph}(V)$:

$$I(V) = I_D(V) + I_{Ph}(V) \quad (1)$$

The overall characteristic curve 13 of the photovoltaic element 1 may be composed from the characteristic curves 7 of the individual segments 5; the photocurrents $I_{Ph,s}(V)$ of the individual segments 5, which are ascertained from individual segments 5 of the photovoltaic element 1, may in particular be summed to give the overall photocurrent $I_{ph}(V)$ of the photovoltaic element 1:

$$I(V) = I_D(V) + \sum_S I_{Ph,S}(V) \quad (2)$$

The overall characteristic curve I(V) of the completely illuminated photovoltaic element 1 may thus be composed from the measured characteristic curves 7 of the individual illuminated segments 5 of the photovoltaic element $I_s(V)$ and the dark characteristic curve 3 $I_D(V)$:

$$I(V) = I_D(V) + \sum_S [I_S(V) - I_D(V)] = -(n-1) \cdot I_D(V) \sum_S I_S(V) \quad (3)$$

wherein n is the number of individual segments 5. The dark characteristic curve 3 $I_D(V)$ is the same for all measurements.

Under less than ideal conditions, interfering ambient light, in particular scattered light, is present when measuring the dark characteristic curve 3 and/or the characteristic curves 7 of the individual segments 5. As a result, when measuring the dark characteristic curve 3, the photovoltaic element 1 is not completely darkened, resulting in an additional current at least partially from the ambient light, and/or when measuring the characteristic curves 7 of the individual segments 5 under illumination by the additional ambient light, an additional photocurrent is present, which distorts the ascertained photocurrent, in particular distorts it to the same extent. In one refinement, this photocurrent, which is additionally obtained from the ambient light, is taken into consideration when ascertaining the dark characteristic curve 3 and/or the characteristic curves 7 of the individual segments 5 in each case by summing a further characteristic curve 17, from which a photocurrent $I_{Ph,amb}(V)$ is ascertained as a function of the ambient light.

If the individual segments 5 are not completely darkened while determining the dark characteristic curve 3, for example due to ambient light, in particular scattered light, then a further photocurrent $I_{ph,amb}(V)$ flows as a function of the ambient light, which is summed to give the obtained photocurrent caused by illuminating the individual segments 5:

$$I(V) = I_D(V) + I_{Ph}(V) + I_{Ph,amb}(V) \quad (4)$$

The characteristic curves 7 of the individual illuminated segments 5 I(V) are obtained from:

$$I(V) = I_D(V) + \sum_S [I_S(V) - I_{amb,S}(V)] \quad (5)$$

wherein $I_{amb,S}(V)$ is the characteristic curve 7 I(V) determined under ambient light:

$$I_{amb,S}(V) = I_D(V) + I_{Ph,amb}(V) \quad (6)$$

The overall characteristic curve 13 I(V) of the photovoltaic element 1 may be obtained therefrom from the individual illuminated segments 5, in particular under defined illumination (1000 W/m²), and the undefined illumination under ambient light. Only a single dark characteristic curve 3 $I_D(V)$ of the photovoltaic element 1 is needed to ascertain the overall characteristic curve 13 of the photovoltaic element 1. This dark characteristic curve 3 may either be provided from data that are already available or be measured at a time in the method before the overall characteristic curve 13 is ascertained in step e). The dark characteristic curve 3 does not have to be measured for each individual segment 5.

The current of each individual segment 5 is:

$$I_S(V) = I_D(V) + I_{Ph}(V) + I_{Ph,amb}(V) \quad (7)$$

The overall current of the photovoltaic element 1 is thus:

$$I(V) = I_D(V) + \sum_S [I_S(V) - I_{amb,S}(V)] \qquad (8)$$

Figure 6:
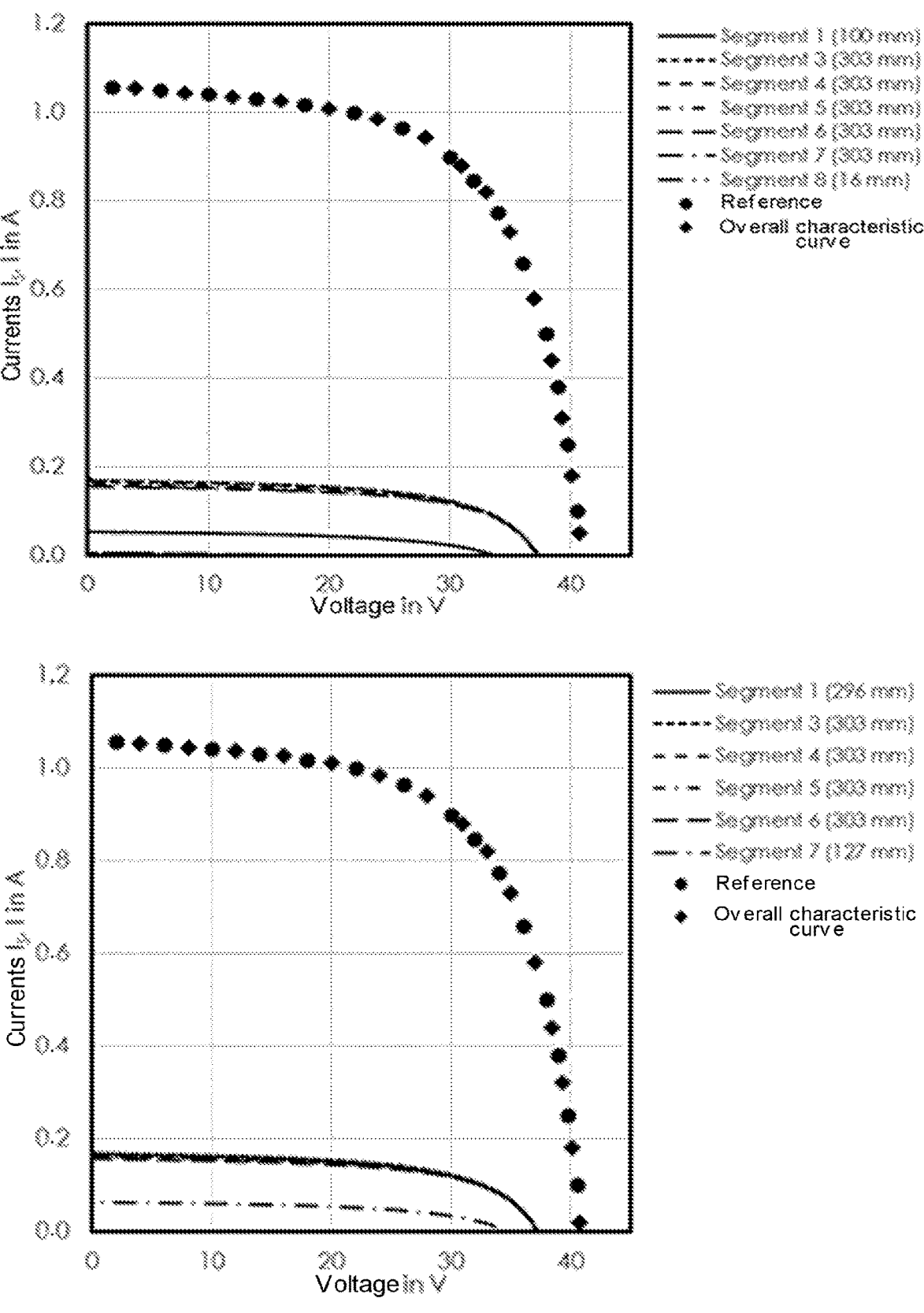
FIG. 6 shows an exemplary embodiment of the influence of the positioning of individual segments when dividing a photovoltaic element in a method according to the invention.

FIG. 6 shows an exemplary embodiment of the influence of the positioning of individual segments 5 when dividing a photovoltaic element 1 in a method according to the disclosure. Identical and functionally equivalent elements have been provided with the same reference signs, and so reference is made to the description above in this respect.

The influence of the positioning of the individual segments 5 when dividing the photovoltaic element 1 was investigated. The respective characteristic curves 7 of individual segments 5 and the resulting overall characteristic curve 13 of a photovoltaic element 1 with different positioning of the individual segments 5 are shown in FIG. 6A and FIG. 6B. In FIG. 6A, the length of the first segment 5 is 100 mm, the length of each of the following six segments 5 is 303 mm, and the length of the last segment 5 is 16 mm. In FIG. 6B, the length of the first segment 5 is 296 mm, the length of each of the following five segments 5 is 303 mm, and the length of the last segment 5 is 127 mm.

In both positionings of the individual segments 5 when dividing the photovoltaic element 1, the overall characteristic curve 13 that is obtained corresponds to a respective reference characteristic curve. The reference characteristic curve was obtained by measuring the overall characteristic curve 13 of the photovoltaic element 1 with complete illumination over its entire length, what is known as a full flash. In the method according to the Disclosure, both positionings reproduce the reference characteristic curve, and the deviation of the profile of the two overall characteristic curves 13 that are obtained is in each case not more than 1% in comparison with the reference characteristic curve. The method according to the Disclosure is accordingly largely independent of the positioning of the individual segments 5 when dividing the photovoltaic element 1.

Figure 7:
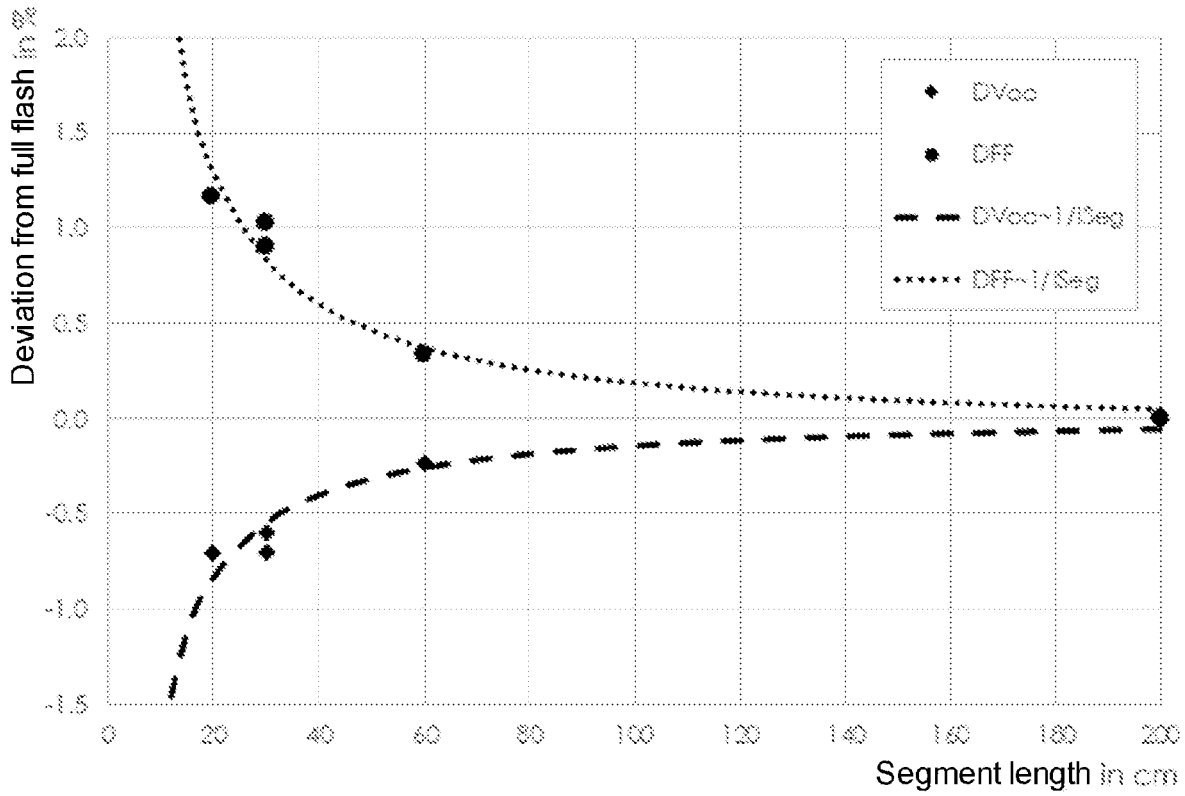
FIG. 7 shows an exemplary embodiment of the influence of a length of the segments when dividing a photovoltaic element in a method according to the invention.

FIG. 7 shows an exemplary embodiment of the influence of a length of the segments 5 when dividing a photovoltaic element 1 in a method according to the Disclosure. Identical and functionally equivalent elements have been provided with the same reference signs, and so reference is made to the description above in this respect.

The influence of the length of the individual segments 5, in particular the size of the individual segments 5, when dividing the photovoltaic element 1 was investigated. In accordance with the method according to the Disclosure, the photovoltaic element 1 was divided in each case into segments 5 with a length of 10 cm, 20 cm, 30 cm, 60 cm and 2 m and measured.

The open-circuit voltage $V_{oc}$ and the fill factor FF of the photovoltaic element 1 were calculated from the resulting overall characteristic curves 13 as a function of the length of the segments 5. The values obtained were compared from an overall characteristic curve of the photovoltaic element 1 given by complete illumination over its entire length and the open-circuit voltage $V_{oc}$ and fill factor FF calculated therefrom. The resulting deviations $DV_{oc}$ and DFF of the measurements according to the Disclosure in comparison with measurements with complete illumination of the photovoltaic element 1 over its entire length are plotted in FIG. 7. The deviation of the open-circuit voltage $V_{oc}$ is less than 1% with a length of the segments 5 of at least 20 cm, and the deviation of the fill factor is less than 1.2% with a length of the segments 5 of at least 20 cm. Lengths of the individual segments 5 of 10 cm also still exhibit a small deviation.

The segments 5, in particular the area of the segments 5, cannot be arbitrarily small, since, with a length of the segments 5 of less than 10 cm, the deviations $DV_{oc}$ and DFF increase significantly. The method according to the Disclosure with segments 5 with a length of 20 cm or more reproduces the values obtained with complete illumination of the photovoltaic element 1 over its entire length very well; this applies in particular to segments 5 with a length of more than 60 cm.

The invention claimed is:

1. A method for inspecting a photovoltaic element, comprising:
   providing a photovoltaic element;
   providing a dark characteristic curve of the photovoltaic element at a specific voltage applied to the photovoltaic element,
   wherein the dark characteristic curve is a characteristic curve measured when the photovoltaic element is completely darkened;
   defining individual segments of the photovoltaic element, the individual segments dividing the photovoltaic element without separation;
   measuring characteristic curves of the individual segments of the photovoltaic element in a time sequence;
   illuminating the individual segments with an illumination device at the specific voltage applied to the photovoltaic element;
   moving the individual segments of the photovoltaic element along a running direction relative to the illumination device and/or moving the illumination device along a running direction relative to the individual segments of the photovoltaic element; and
   ascertaining an overall characteristic curve of the photovoltaic element as a function of the dark characteristic curve and the measured characteristic curves of the individual segments, such that the photovoltaic element is able to be inspected,
   wherein ascertaining the overall characteristic curve of the photovoltaic element comprises summing photocurrents ascertained from the dark characteristic curve of the photovoltaic element and photocurrents ascertained from the measured characteristic curves of the individual segments.

2. The method as claimed in claim 1, wherein the individual segments are illuminated over their entire photoactive area.

3. The method as claimed in claim 1, wherein the individual segments of the photovoltaic element are each illuminated at least homogeneously.

4. The method as claimed in claim 1, wherein a segment of the photovoltaic element has no overlap and no gap with a previous segment and/or with a following segment in the running direction.

5. The method as claimed in claim 1, wherein a photoactive area of the photovoltaic element is completely covered by the individual segments.

6. The method as claimed in claim 1, further comprising providing the dark characteristic curve before or after the measuring the characteristic curves; and wherein the dividing the photovoltaic element into individual segments and the measuring of the characteristic curves occur simultaneously or concurrently.

7. The method as claimed in claim 1, wherein the dark characteristic curve of the photovoltaic element is a dark characteristic curve in complete or largely complete darkness.

8. The method as claimed in claim 1, further comprising measuring at least one further curve at the specific voltage applied to the photovoltaic element and in ambient light when ambient light is present.

9. The method as claimed in claim 8, wherein the individual segments and/or the photovoltaic element are not illuminated by the illumination device, and wherein the ascertaining the overall characteristic curve comprises ascertaining the overall characteristic curve as a function of the at least one further characteristic curve in ambient light.

10. The method as claimed in claim 8, wherein the ascertaining the overall characteristic curve comprises subtracting photocurrents of ambient light ascertained from the further measured characteristic curves of the individual segments in ambient light.

11. The method as claimed in claim 1, wherein a length of the segments in the running direction is 10 cm to 10 m.

12. The method as claimed in claim 1, further comprising dividing the photovoltaic element into individual segments depending on an area illuminated by way of the illumination device.

13. The method as claimed in claim 1, wherein the method is performed in a roll-to-roll process, and/or wherein the photovoltaic element is a flexible photovoltaic element.

14. A photovoltaic element inspected using a method as claimed in claim 1.

* * * * *